July 23, 1946.  R. R. WIRTH  2,404,556
UNDERWATER INSPECTION AND PHOTOGRAPHING DEVICE
Filed April 5, 1944  4 Sheets-Sheet 1
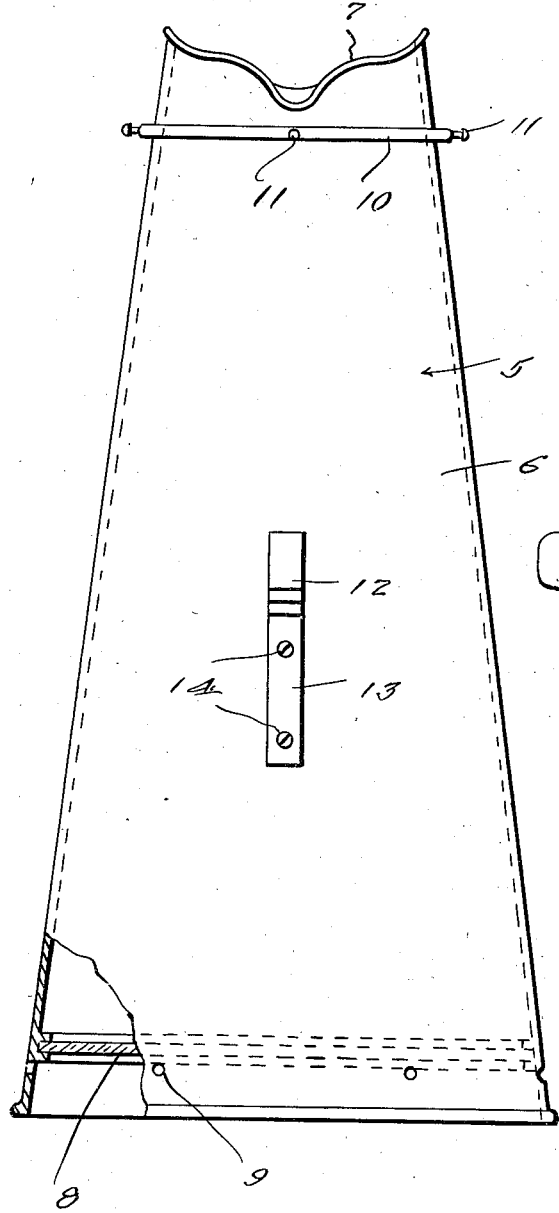
Inventor
Richard R. Wirth,
By Clarence A. O'Brien
and Harvey B. Jacobson
Attorneys

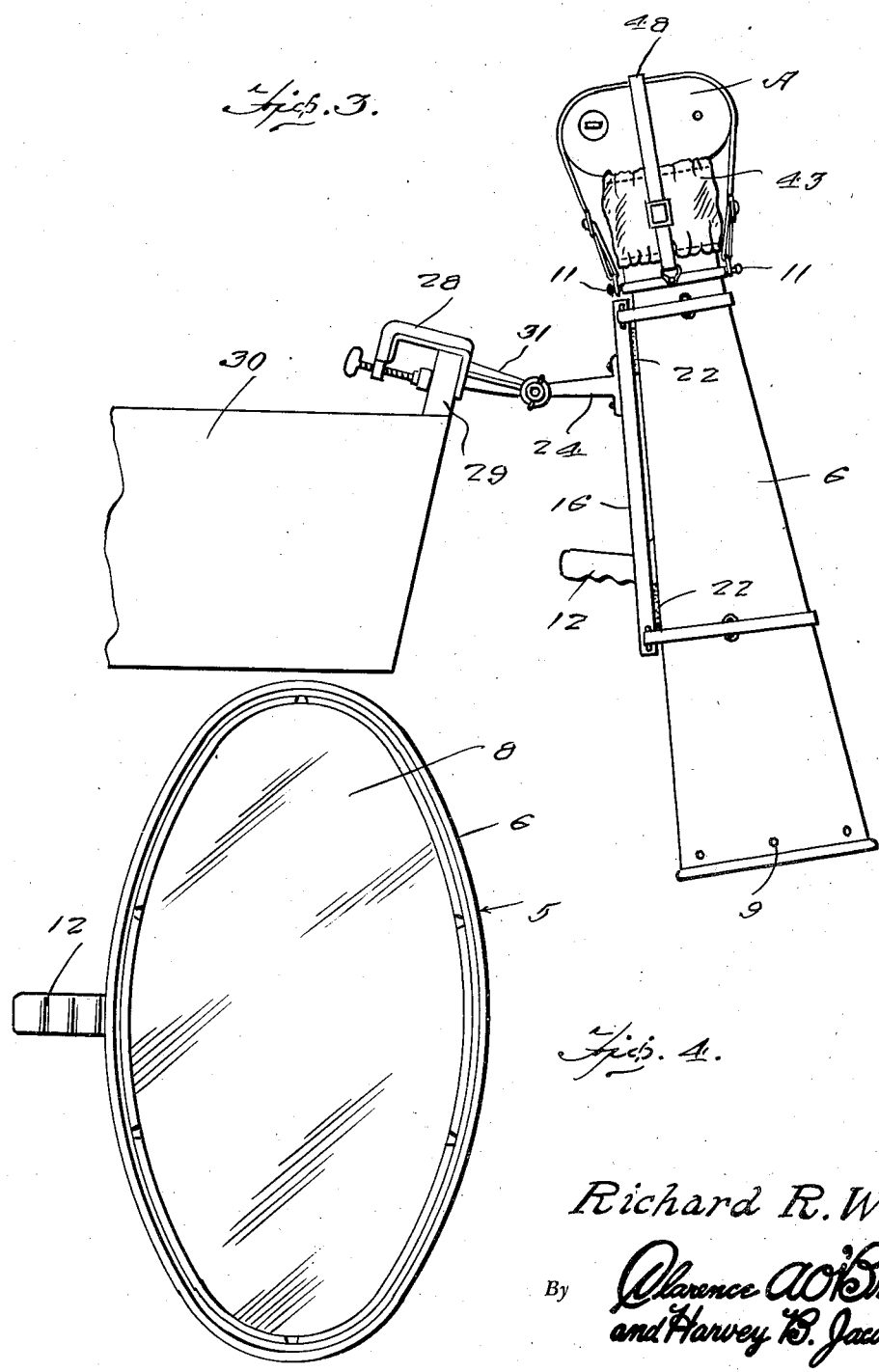

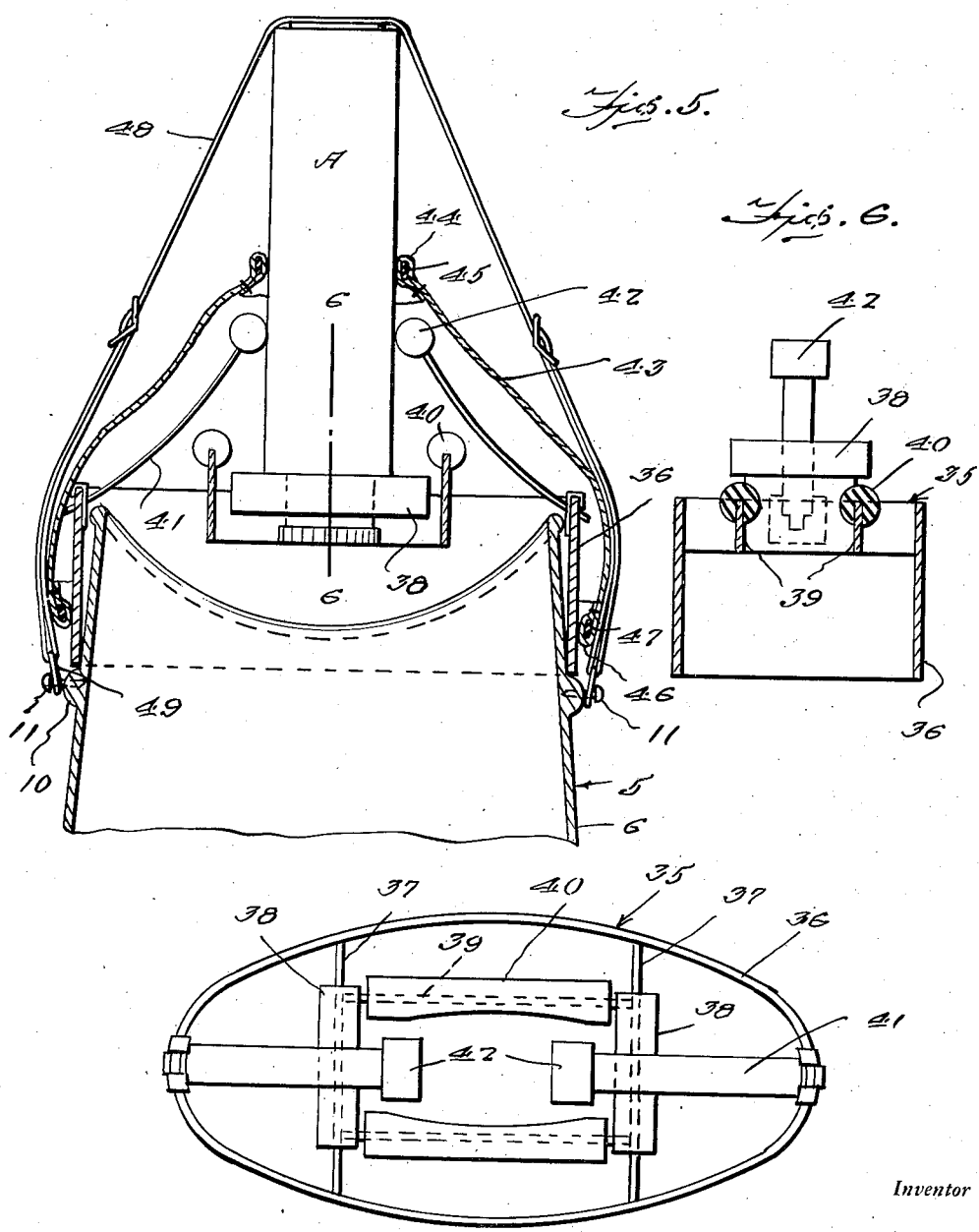

July 23, 1946.　　　　　R. R. WIRTH　　　　　2,404,556
UNDERWATER INSPECTION AND PHOTOGRAPHING DEVICE
Filed April 5, 1944　　　　4 Sheets-Sheet 4
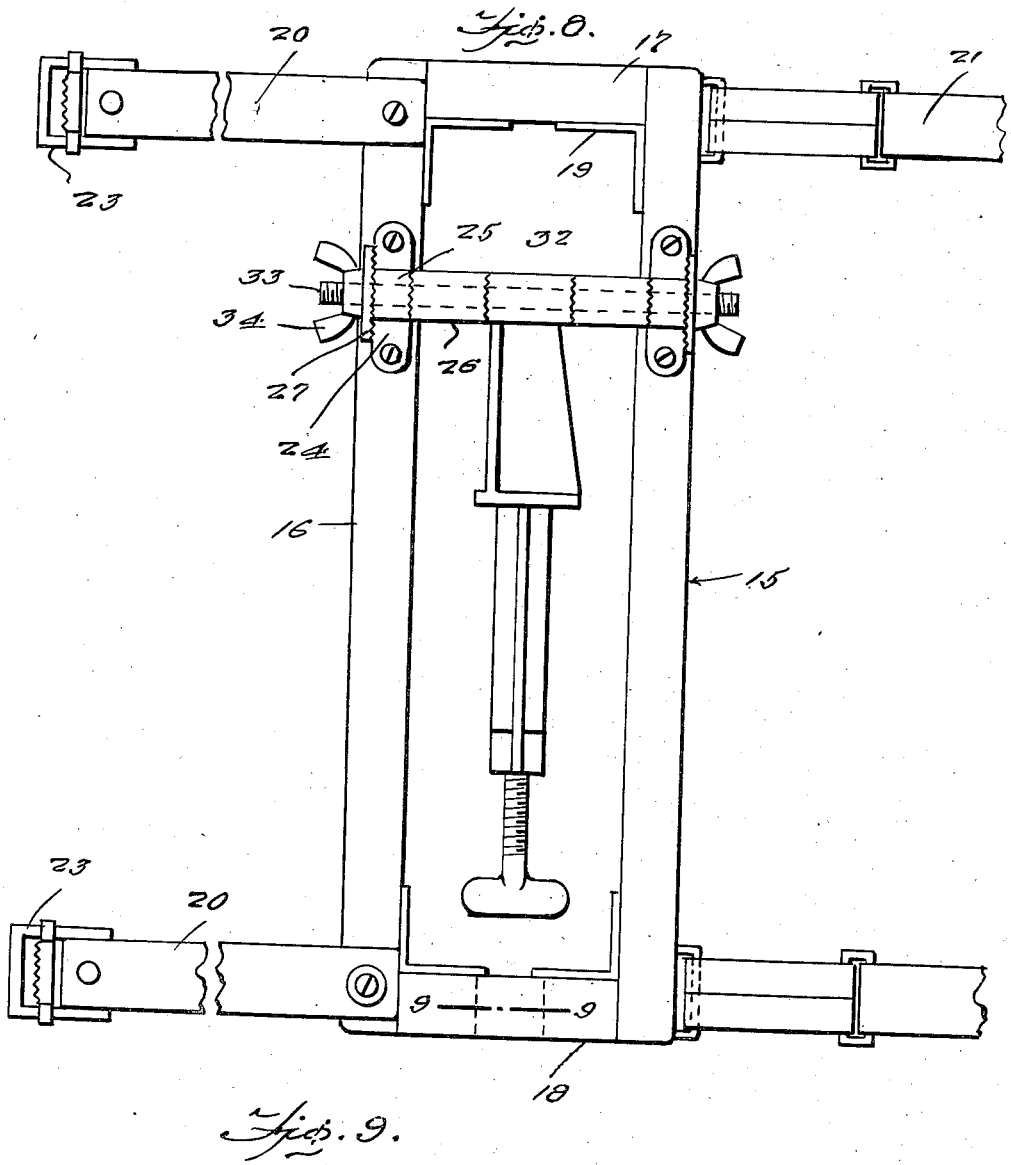
Inventor
Richard R. Wirth,
By Clarence A. O'Brien
and Harvey B. Jackson
Attorneys Patented July 23, 1946

2,404,556

UNITED STATES PATENT OFFICE 2,404,556

UNDERWATER INSPECTION AND PHOTOGRAPHING DEVICE

Richard R. Wirth, Westwood, Ohio

Application April 5, 1944, Serial No. 529,662

3 Claims. (Cl. 95—11)

This invention relates to new and useful improvements in underwater studying devices and more particularly to a device for inspecting undersurface marine life, the principal object being to provide such a device which may be used for looking at underwater marine life or upon which a camera can be conveniently mounted for photographing underwater life.

Other objects and advantages of the invention will become apparent to the reader of the following description.

In the drawings:

Figure 1 is a front elevational view of the underwater inspection device with a portion broken away.

Figure 2 is a side elevational view of the device.

Figure 3 is a fragmentary side elevational view showing the device attached to the rear of a boat and with a camera mounted thereon.

Figure 4 is a bottom plan view of the device shown in Figures 1 and 2.

Figure 5 is a fragmentary vertical sectional view through the upper portion of the device and showing a camera mounted thereon.

Figure 6 is a sectional view taken substantially on the line 6—6 of Figure 5 with the camera, hood and securing means removed.

Figure 7 is a top plan view of the camera holding means.

Figure 8 is a spread out plan view of the boat attaching harness.

Figure 9 is a fragmentary elevational view showing cushioning means for the harness.

Referring to the drawings wherein like numerals designate like parts, it can be seen that numeral 5 generally refers to the underwater inspection device which consists of an elongated downwardly flaring shell 6 of preferably ovate shape in cross section throughout its entire length.

The upper portion 7 of the tube is formed to fit the nose and face of a person looking through the device so that no light will enter the interior and cause a glare on a pane 8 which is fitted across the lower enlargd end of the tube. Vents 9 are provided in the portion of the tube just below the pane 8. If desired, the pane 8 may have some magnifying effect.

A collar 10 is provided around the upper portion of the tube 6 and this has headed projections 11 thereon to cooperate with the camera holding means shown in Figure 5.

About midway down the front side of the tube 6 is a handle 12 having a foot portion 13 secured as at 14 to the tube 6.

Numeral 15 (see Figure 8) denotes a harness for attaching the device to the rear of a row-boat or the like and this consists of a pair of vertical spaced parallel members 16, 16 connected by bridge members 17 and 18 at the upper and lower portions thereof, thus defining a frame, the corner portions of which can be reinforced by angle members 19.

The lower bridge member 18 has a notched out portion covered by cushioning material 20 and this fits over the foot portion 13 of the handle 12.

Straps 20 and 21 are provided at the upper and lower portions of the harness frame for embracing the tube 6 and holding the harness snugly in place. Suitable cushioning plates or blocks 22 may be interposed between the harness frame and the tube 6. The straps 20 can be provided with buckles 23.

Arms 24 project from the parallel members 16 and have apertured heads 25 at their outer ends, toothed at the opposite sides thereof to be engaged by the corresponding toothed ends of sleeves 26 and washers 27.

Numeral 28 denotes a clamp adapted to be clamped on to the stern 29 of a boat 30 and this has a projection 31 having a barrel 32 toothed at its opposite ends for engaging the adjacent toothed ends of the sleeve 26. A threaded member 33 is disposed through the heads 25, sleeve 26 and barrel 32 and also through the washers 27 and wing nuts 34 on the ends of this threaded member 33 serve to hold these parts in fixed adjusted position.

Numeral 35 denotes means for supporting a movie camera or other camera upon the upper end of the tube 6. This consists of an ovate-shaped band 36 having a pair of cross members 37, 37 supporting cushion members 38, 38. Interposed between the cross members 37, 37 are parallel members 39, 39 for supporting cushion members 40, 40.

The cushion members 40, 40 are intended for supporting a box-type camera, whereas the lower cushion members 38, 38 are intended for supporting a narrow movie-type camera A. (See Figure 5.)

Spring arms 41 project inwardly from the ends of the band 36 and have cushion heads 42, 42 which are adapted to bear against a camera in the manner shown in Figure 5.

Numeral 43 denotes a hood for preventing light from entering the tube 6, this having a hem formed edge portion 44 through which a pull string 45 is disposed and a similar hem 46 having a pull string 47 is provided at the lower edge of this hood.

Straps 48 pass over the camera A and have loops 49 at their ends for engagement with the headed projections 11, as shown in Figure 5.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An underwater inspection device comprising an elongated tube having a transparent pane at the lower end thereof, and a camera attaching structure at the upper end of the tube including a cushion support for the lens end of the camera, yielding arms for engaging the sides of the camera to steady the same, and straps for extending around the rear end of the camera to hold the same against said support.

2. In an underwater inspection device for attachment to a boat, a tube, and means to attach said tube to one side of the boat in upright position comprising an elongated frame extending endwise along one side of the tube, straps extending from opposite ends of the frame around said tube, arms extending from opposite sides of the frame adjacent one end thereof, a clamp for direct attachment to the boat, and means connecting said arms to said clamp for swinging of said frame thereon into different set positions.

3. In an underwater inspection device for attachment to a boat, a tube adapted to be attached to the boat in upright position, a camera at the upper end of the tube, and means to secure the camera in said end of said tube to project out of the same comprising a band surrounding said upper end of the tube, a cushion support in said band for the lens end of the camera, yielding arms extending from opposite sides of the band to opposite sides of the camera for steadying the same and having the cushion ends bearing against opposite sides of the camera, and straps extending from opposite sides of said band across the rear end of the camera.

RICHARD R. WIRTH.